United States Patent [19]

Ozawa et al.

[11] Patent Number: 4,779,964
[45] Date of Patent: Oct. 25, 1988

[54] ZOOM LENS WITH A MECHANISM FOR MOVING A FIRST LENS SO AS TO BE COMPACTLY HOUSED

[75] Inventors: Toshiro Ozawa, Kawasaki; Yoshio Fukushima, Machida; Kenichi Takanashi, Yokohama, all of Japan

[73] Assignee: Ricoh Company, Ltd., Tokyo, Japan

[21] Appl. No.: 928,856

[22] Filed: Nov. 10, 1986

[30] Foreign Application Priority Data

Nov. 8, 1985 [JP] Japan .............................. 60-250352
Feb. 6, 1986 [JP] Japan .............................. 61-15061

[51] Int. Cl.⁴ .................... G02B 15/14; G02B 7/02; G03B 19/02; G03B 17/04
[52] U.S. Cl. .................................. 350/427; 350/429; 350/255; 354/208; 354/187
[58] Field of Search ............... 350/427, 423, 429, 255, 350/422; 354/208, 187, 195.11, 195.12

[56] References Cited

U.S. PATENT DOCUMENTS

| | | |
|---|---|---|
| 4,626,076 | 12/1986 | Oshima et al. ..................... 350/427 |
| 4,627,691 | 12/1986 | Tomori .............................. 350/429 |
| 4,636,040 | 1/1981 | Tokumaru .......................... 350/427 |
| 4,643,555 | 2/1987 | Wakabayashi .................. 354/195.12 |
| 4,659,186 | 4/1987 | Sato et al. ..................... 350/427 X |
| 4,669,848 | 6/1987 | Wakabayashi .................. 354/195.12 |
| 4,681,406 | 6/1987 | Naito et al. ........................ 350/429 |
| 4,682,854 | 7/1987 | Hanamori et al. .................. 350/429 |

FOREIGN PATENT DOCUMENTS 184915 10/1983 Japan .
199312 11/1983 Japan .

Primary Examiner—John K. Corbin
Assistant Examiner—Ronald M. Kachmarik
Attorney, Agent, or Firm—Oblon, Fisher, Spivak, McClelland, & Maier

[57] ABSTRACT

A zoom lens has at least a first group lens and a second group lens which are spaced a greater distance from each other in one of telephoto setting and wide angle setting than the other setting, and a mechanism for moving the first group lens from said one setting toward an image formation plane.

16 Claims, 10 Drawing Sheets

F I G. 16
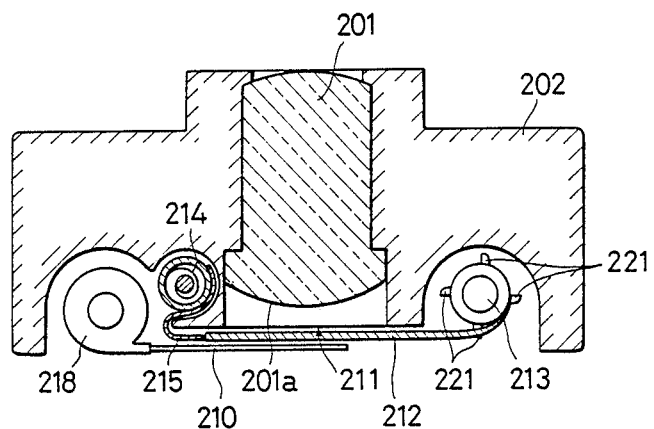
F I G. 17
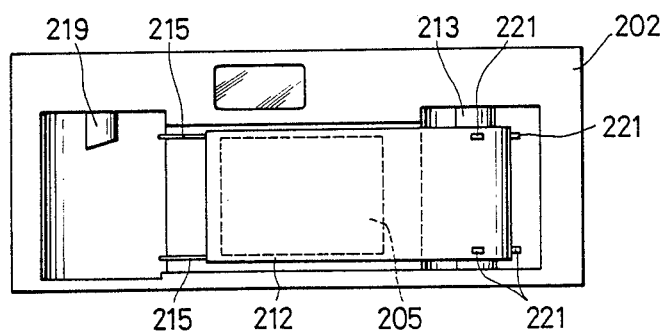
F I G. 18
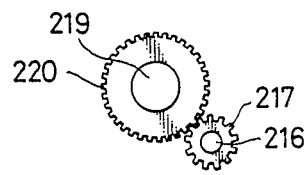

ZOOM LENS WITH A MECHANISM FOR MOVING A FIRST LENS SO AS TO BE COMPACTLY HOUSED

BACKGROUND OF THE INVENTION

1. Field of the Invention

The present invention relates generally to a lens and more particularly to a zoom lens for use in a camera.

2 Description of the Background

Remarkable progress has been made in recent years for miniaturization of cameras. Major attempts heretofore made to miniaturize cameras have been to reduce the focal length of the lens used. However, if the focal length of a camera lens is reduced with respect to a fixed image plane or plate size, then the angle of view of the lens is increased, with the result that an image taken on the film is necessarily reduced in size. Therefore, when people are photographed at a substantial distance using a camera with such a lens, the faces of the people on the photoprint cannot easily be identified. In view of this problem, there has been a demand for a compact camera having a lens with a long focal length.

To meet such a demand, a camera with a bifocal lens and a camera with a zoom lens have been developed for accommodating a wider range of photographic conditions. The zoom-lens camera is advantageous over the bifocal-lens camera in that it can continuously vary the focal length, but is disadvantageous since it is more difficult to miniaturize than the bifocal-lens camera.

Various zoom lenses with a short back focus have been proposed to make rangefinder-equipped cameras with zoom lenses compact. Examples of such zoom lenses are disclosed in Japanese Laid-Open Patent Publications Nos. 56-128911, 58-184915, 58-184916, 58-224322, 58-137813, 58-184917, and 58-199312, for example.

However, cameras with such zoom lenses having short back focuses are larger in size when the zoom lens is stored or retracted than those cameras which have lenses storable into camera bodies, such as a camera with a collapsible lens barrel or mount or a self-erecting camera. The latter cameras are also large in size when in use because they employ lenses having long back focuses. Therefore, the use of a zoom lens in such cameras would inevitably result in a larger size.

SUMMARY OF THE INVENTION

It is an object of the present invention to provide a zoom lens which includes a first lens that is movable toward an image formation plane when not in use, and which allows a camera, on which the zoom lens is mounted, to be highly compact when the zoom lens is stored or retracted.

According to the present invention, a zoom lens has a first lens and a second lens, which are spaced a greater distance from each other in either of the telephoto setting or the wide angle setting than the other setting. The zoom lens includes a mechanism for moving the first lens from the first setting toward an image formation plane. When the zoom lens is not in use, the first lens can be moved by the mechanism from the first setting toward the image formation plane so as to be stored, thereby reducing the overall length of the zoom lens.

FIGS. 1(a) through 1(c) are schematic views of various zoom lens types to which the present invention is applicable;

Figure 12:
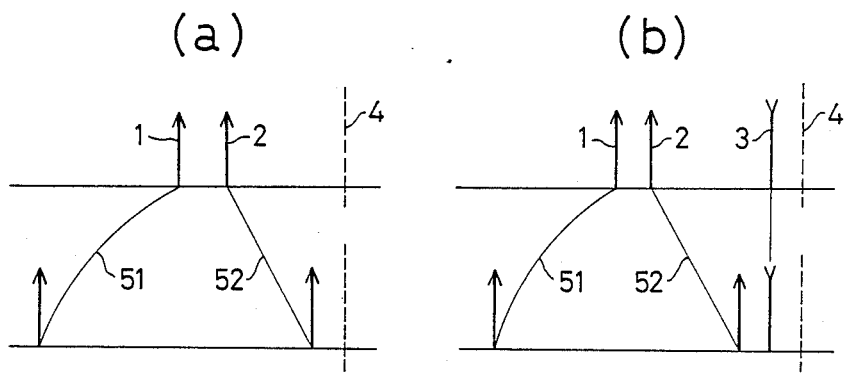
Figure 13:
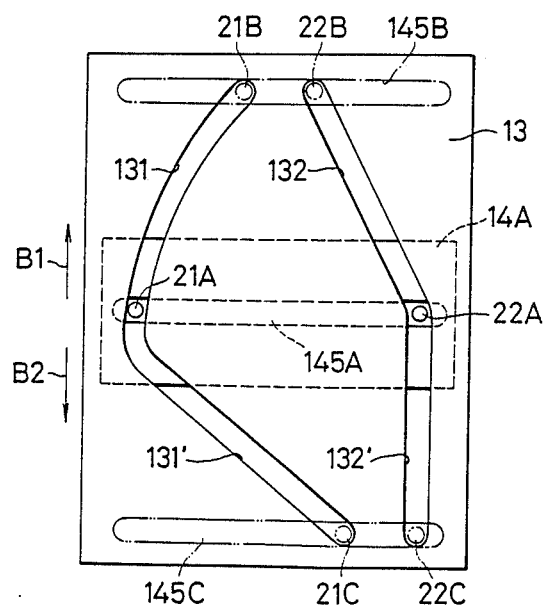
Figure 14:
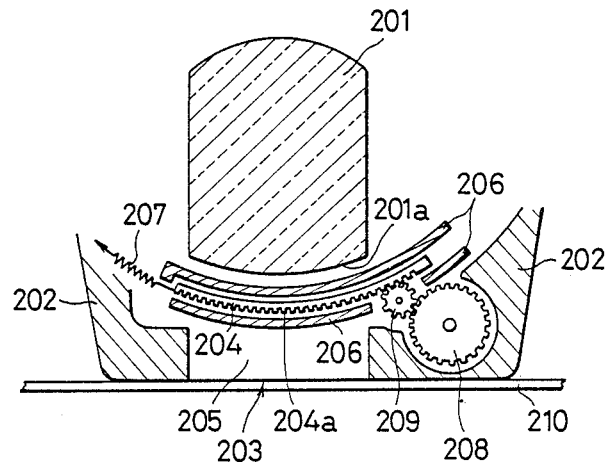
Figure 15:
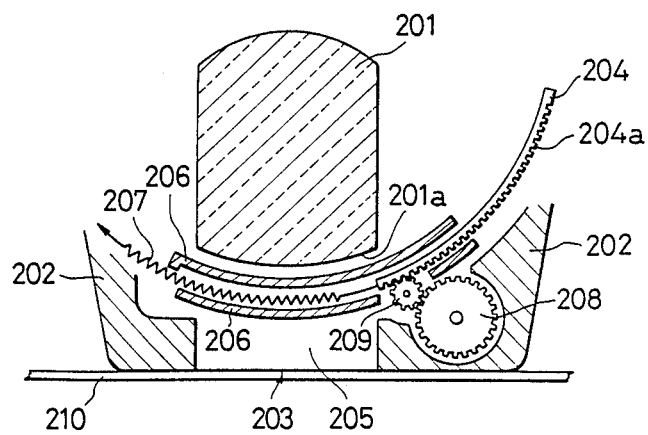
Figure 19:
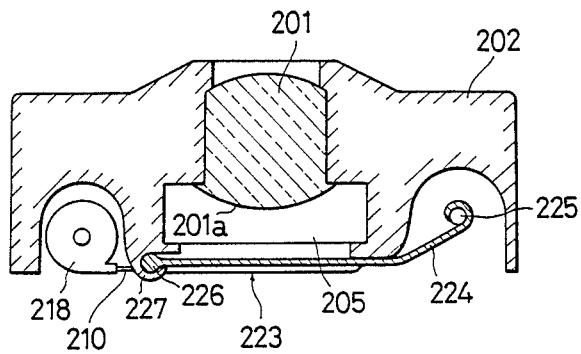
Figure 20:
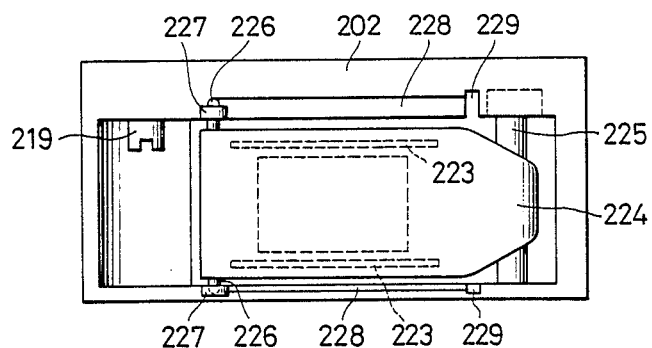
Figure 21:
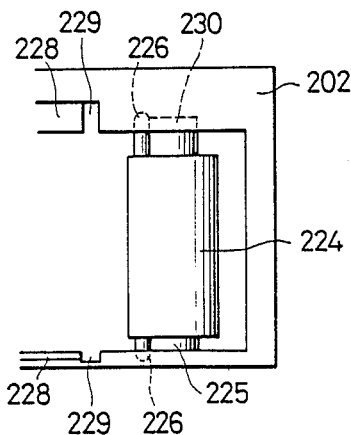
Figure 22:
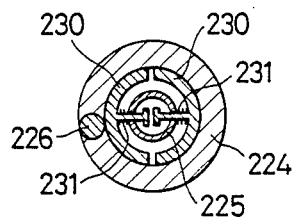
Figure 23:
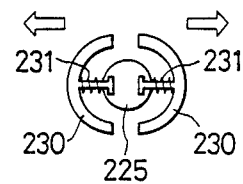
Figure 24:
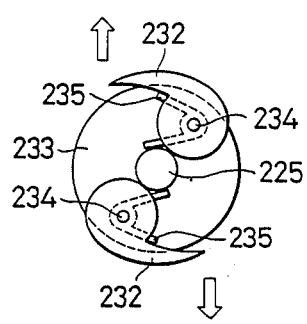
Figure 26:
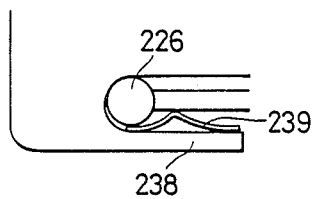
Figure 25:
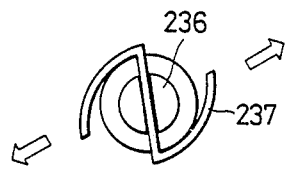
Figure 27:
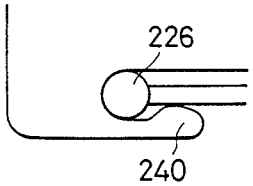
Figure 28:
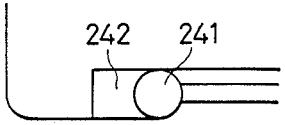

FIGS. 12(a) and 12(b) are schematic views of other zoom lens types to which the present invention is applicable;

FIG. 13 is a developed plan view of cam grooves that can be employed in the zoom lens types of FIGS. 12(a) and 12(b);

FIG. 14 is a cross-sectional view of a lens protector according to an embodiment of the present invention;

FIG. 15 is a cross-sectional view showing the manner in which the lens protector of FIG. 14 operates;

FIG. 16 is a cross-sectional view of a lens protector according to another embodiment of the present invention;

FIG. 17 is a rear elevational view of the lens protector shown in FIG. 16;

FIG. 18 is a plan view of a portion of the lens protector of FIG. 16;

FIG. 19 is a cross-sectional view of a lens protector according to still another embodiment of the present invention;

FIG. 20 is a rear elevational view of the lens protector shown in FIG. 19;

FIG. 21 is a fragmentary rear elevational view showing the manner in which the lens protector of FIG. 19 operates;

FIG. 22 is a cross-sectional view of a lens protecting member shown in FIG. 21;

FIG. 23 is a plan view showing the manner in which a spool assembly shown in FIG. 21 operates;

FIGS. 24 and 25 are plan views of lens protectors according to other embodiments; and FIGS. 26 through 28 are fragmentary plan views of modifications of the lens protector illustrated in FIG. 19.

FIGS. 1(a) through 1(c) illustrate various zoom lens types to which the principles of the present invention are applicable. The zoom lens shown in FIG. 1(a) comprises a positive first lens 1 and a negative second lens 2. FIG. 1(b) shows a zoom lens composed of a positive first lens 1, a negative second lens 2, and a positive third lens 3. In FIG. 1(c), a zoom lens comprises a positive first lens 1, a negative second lens 2, and a negative third lens 3. In terms lenses, however, the of a power distribution of the zoom lens types shown in FIGS. 1(b) and 1(c) belong to the zoom lens type of FIG. 1(a). Specific structures of these zoom lens types are shown in aforesaid Japanese Laid-Open Patent Publications Nos. 56-128911, 58-184915, 58-184916, and 58-224322. In each of FIGS. 1(a), 1(b), and 1(c), the lenses shown on the upper line are in the wide angle setting and the lenses shown on the lower line are in the telephoto setting. Designated in FIGS. 1(a), 1(b) at 51, 52, 53 are paths along which the first, second, and third lenses are movable, and at 4 is an image formation plane.

According to an embodiment of the present invention, when the first and second lenses 1, 2 are widely spaced from each other at a stroke end (in the wide angle setting for all of the zoom lenses shown in FIGS. 1(a) through 1(c)), and when the zoom lens is not in use, the first lens 1 is moved a large distance toward the image formation plane 4 into the vicinity of the second lens 2 as indicated by the thick arrows, so that the overall length of the lens is reduced when not in use.

Figure 1:
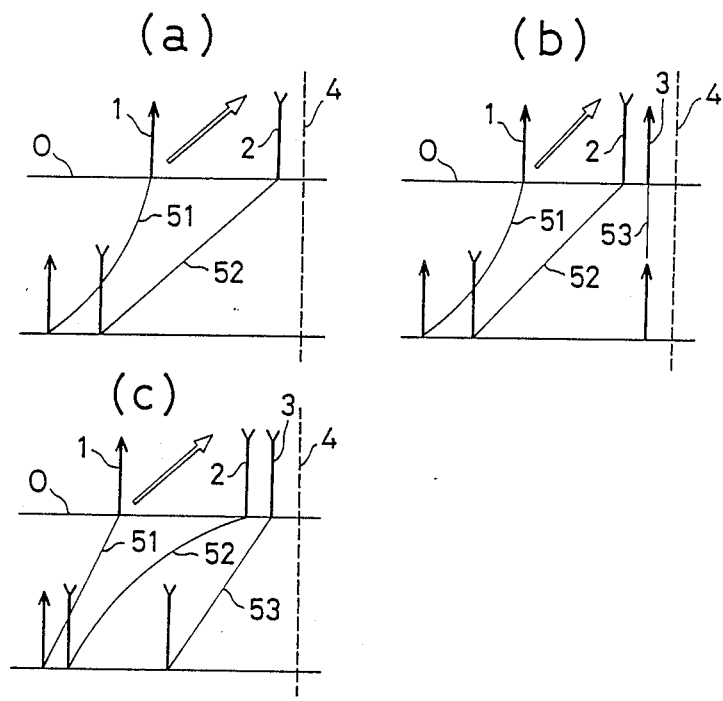
Figure 2:
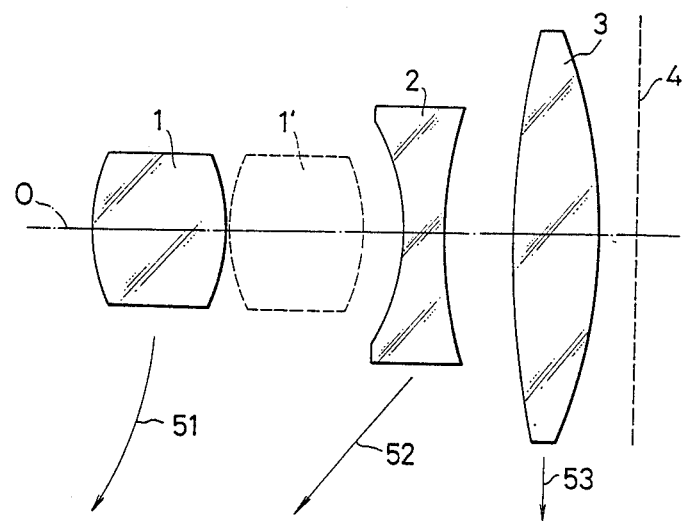
FIG. 2 is an elevational view of one of the zoom lens types.

FIG. 2 schematically shows the zoom lens of the type illustrated in FIG. 1(b). The lenses 1, 2, 3 are arranged in the wide angle setting and are movable along the paths 51, 52, 53 for the telephoto setting. When the zoom lens is not in use, rhe first lens 1 is moved from the stroke end of the wide angle setting toward the image formation plane into the position 1' indicated by the broken line. By thus moving the first lens 1, the overall length of the zoom lens is so reduced that the entire zoom lens can be stored within a space covered by the thickness of a camera body on which the zoom lens is mounted.

Figure 3:
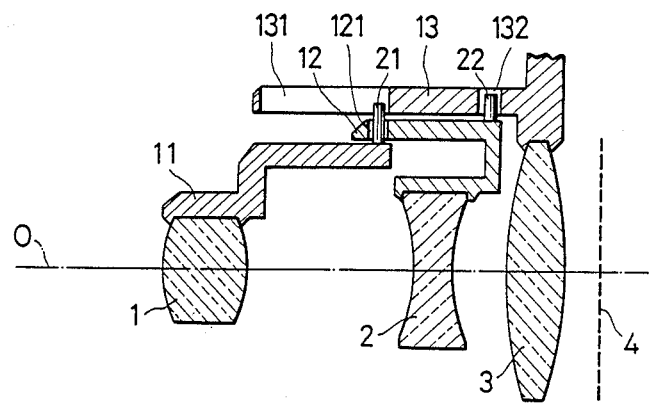
FIG. 3 is a cross-sectional view of a zoom lens according to an embodiment of the present invention.

FIGS. 3 through 8 show lens barrels arranged so as to be capable of moving the lenses as shown in FIG. 2. The lens barrels has cam grooves defined therein for moving the lenses upon zooming and storage. The lenses are in the wide angle setting in FIG. 3, are in the telephoto setting in FIG. 4, and are stored in FIG. 5. Cam surfaces of the lens barrels are illustrated in developed plan in FIGS. 6 and 7 for indicating the relative relationship between the cam grooves. For the sake of brevity in FIGS. 3 through 5, a shutter and an aperture are omitted from illustration, the lens barrels which are actually in sliding contact are shown as being spaced for a better understanding, and the lower half portions of the lens barrels are also omitted from illustration. Pins movable in and along the cam grooves are shown as lying in one cross-sectional plane for an easier understanding, though they are actually not in one plane.

In FIGS. 3 through 7, the first through third lenses 1, 2, 3 are supported by first through third lens barrels 11, 12, 13, respectively, and the first and second lens barrels 11, 12 are axially movable whereas only the third lens barrel 13 is fixed with respect to a camera body (not shown). The second lens barrel 12 has a cam groove 121 defined in and along its circumferential wall, and a pin 21 fixedly mounted on an outer circumference of the first lens barrel 11 slidably engages the cam groove 121.

Figure 7:
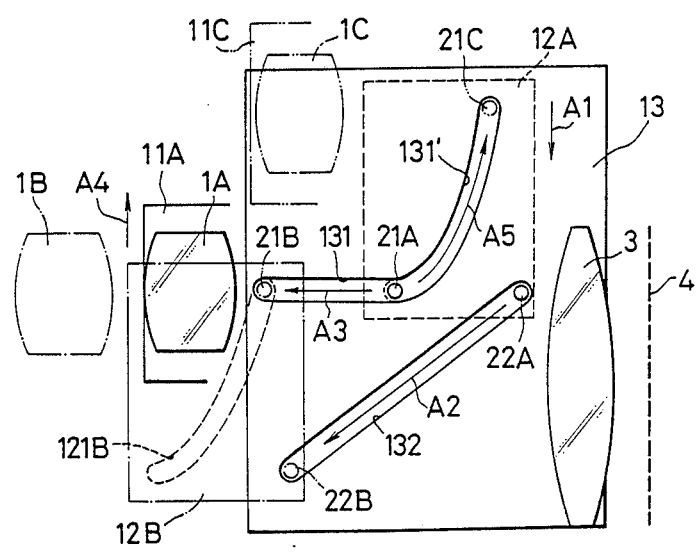
FIG. 7 is a developed plan view of lens barrels and cam grooves of the zoom lens.

The third lens barrel 13 has two cam grooves 131, 132 defined in and along its circumferential wall. The cam groove 131 extends rectilinearly parallel to an optical axis O and has an end closer ro the image formation plane 4 and contiguous to a curved can groove 131' (FIG. 7). The curyed cam groove 131' is of the same shape and size as those of the cam groove 121 of the second lens barrel 12. As long as the lenses are positioned between the stroke end of the wide angle setting (FIG. 3) and the stored position (FIG. 5), the cam grooves 121, 131' are fully overlapped. The cam groove 132 of the third lens barrel 13 is substantially straight and extends at a constant angle to the optical axis O.

The pin 21 extends through the cam groove 121 of the second lens barrel 12 and slidably engages the cam grooves 131, 131'. Another pin 22 fixedly mounted on an outer circumference of the second lens barrel 12 slidably engages the cam groove 132.

Figure 6:
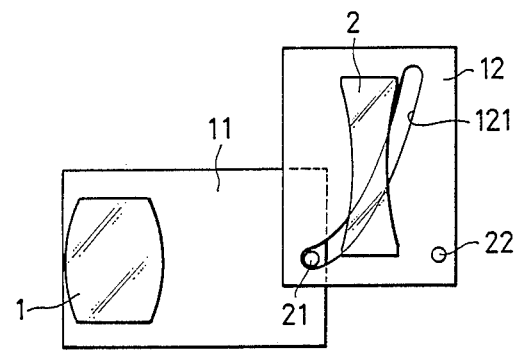
FIG. 6 is a developed plan view of first and second lens barrels of the zoom lens.

FIG. 6 shows in developed plan the relationship between the first and second lens barrels 11, 12, and also illustrates the positions to be assumed by the lenses 1, 2. Since the lens barrels are shown as being developed, only the distance at which the lenses 1, 2 are spaced from each other along the optical axis is correctly depicted. In FIG. 6, the first and second lenses 1, 2 are shown as being most widely spaced from each other, and this illustrated position corresponds to the lens position in the wide angle setting shown in FIG. 8 at (b).

In FIG. 7, the fixed third lens barrel 13 is shown as being developed, and te relative positional relationship of the pins 21, 22 when they are moved along the respective cam grooves is partly shown by the dot-and-dash lines and two-dot-and-dash lines. The various components as indicated with a suffix A are positioned at the stroke end of the wide angle setting, which is an initial position, the components as indicated with a suffix B are positioned at the stroke end of the telephoto setting, and the components as indicated with a suffix C are in the stored position.

Operation of a zooming mechanism for moving the lens barrels 11, 12, 13 will be described below.

It is assumed that the position assumed by the lens barrels at the stroke end of the wide angle setting as shown in FIG. 3 is an initial position. When the second lens barrel 12 is turned from the initial position downwardly in FIG. 7 (in the direction of the arrow A1), the pin 22 is slidably moved along the cam groove 132 of the fixed third lens barrel 13 in the direction of the arrow A2, causing the second lens barrel 12 to move also in the direction of the arrow A2. To permit the second lens barrel 12 to move in this manner, it must be rotatable about the optical axis O and movable along the optical axis O.

As the second lens barrel 12 is moved in the direction of the arrow A2, it travels away from the image formation plane 4. Therefore, the cam groove 121 of the second lens barrel 12 which has been aligned with the cam groove 131' of the third lens barrel 13 in the initial position is also moved with the second lens barrel 12, out of alignment with the cam groove 131'. Since the cam grooves 131, 131' of the third lens barrel 13 are stationary, the pin 21 of the first lens barrel 11 which engages in the cam groove 131 through the cam groove 121 is positioned where the cam grooves 131, 121 intersect. Inasmuch as the cam groove 121 is translated parallel to the direction of the arrow A2 as the second lens barrel 12 is turned, the area where the cam grooves 131, 121 intersect is rectilinearly moved from the initial position along the optical axis O in the direction of the arrow A3.

Figure 4:
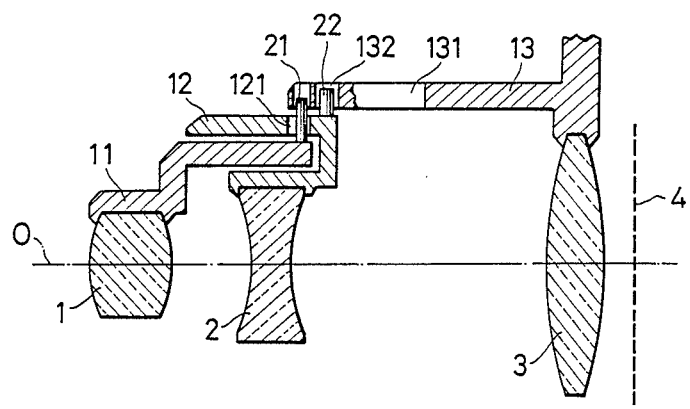
FIG. 4 is a cross-sectional view showing one mode of operation of the zoom lens shown in FIG. 3.
Figure 8:
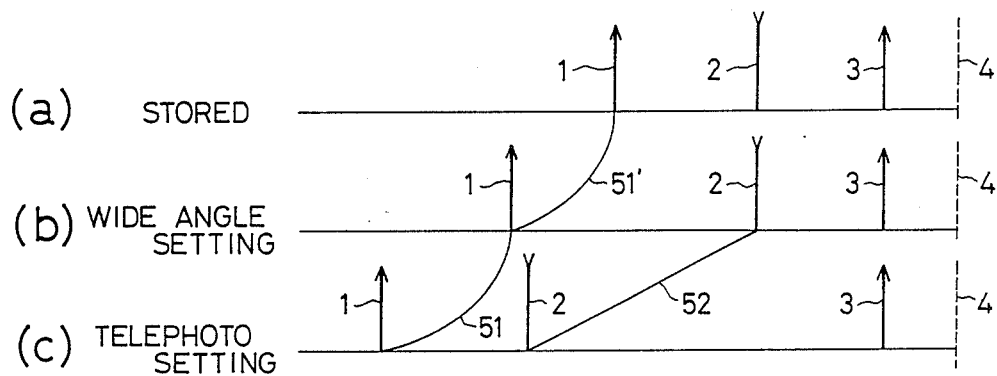
FIG. 8 is a schematic view showing different lens positions that can be assumed by lenses of the zoom lens.

When the pin 22 reaches the terminal end of the cam groove 132, terminating the angular movement of the second lens barrel 12, the first lens 1 is in the most advanced or projected position 1B as indicated by the dot-and-dash lines. The second lens 2 is also in the most advanced or projected position on account of the movement of the second lens barrel 12 along the optical axis O. The first and second lenses 1, 2 are now at the stroke end of the telephoto setting as shown in FIG. 4 and FIG. 8 at (c).

Because the relative positional relationship between the first lens 1 and the pin 21 and the relative positional relationship between the second lens 2 and the pin 22 remain unchanged, the movements of the pins 21, 22 along the optical axis O represent the movements of the first and second lenses 1, 2. Therefore, the first and second lenses 1, 2 move along the paths 51, 52 as shown in FIG. 3 between (b) and (c), thus continuously changing the focal length. The cam groove 132 is straight because the path 52 is straight, and the cam groove 121 is curved because the difference between the paths 51, 52 varies in a curved pattern.

By turning the second lens barrel 12 in the opposite direction, the components return from the telephoto setting position back to the initial position while at the same time the focal length is continuously changed from the telephoto setting to the wide angle setting.

The aforesaid movements of the first and second lens barrels 11, 12 are the same as those of general zoom lenses which are known in the art. The zooming mechanism of the invention can also retract the first lens 1 from the initial position to the stored position. Such storing operation will be described below.

Figure 5:
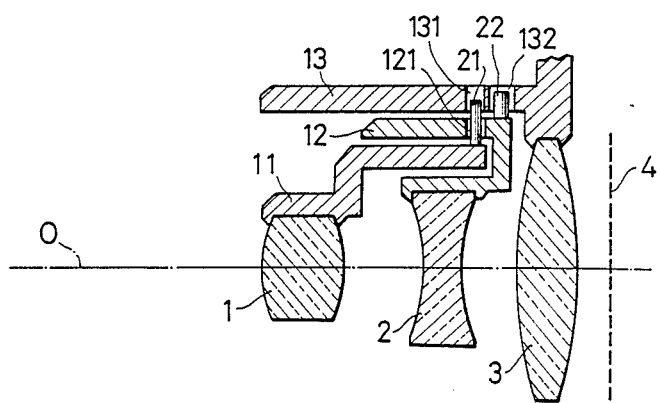
FIG. 5 is a cross-sectional view showing another mode of operation of the zoom lens shown in FIG. 3.

When the first lens barrel 11 is turned by a suitable means from the initial position in the direction indicated by the arrow A4 (FIG. 7), the pin 21 is moved in and along the cam groove 121 in the direction of the arrow A5. Since the cam groove 121 is aligned with the cam groove 131' in the initial position, the pin 21 can move smoothly, without any substantial resistance, in and along the cam grooves 121, 131'. When the pin 21 reaches the terminal ends of the cam grooves 121, 131', the first lens 1 is stored as shown in FIG. 5 and FIG. 8 at (a). In such storing operation, only the first lens 1 is moved toward the image formation plane 4. The first, second, and third lenses 1, 2, 3 are now located in most closely packed condition and stored within a range or space corresponding to the length of the fixed third lens barrel 13.

The first lens 1 moves from the wide angle setting position to the stored position along a path 51' (between (a) and (b) of FIG. 8) which is determined by the configuration of the cam groove 121.

As described above, zooming is effected by turning the second lens barrel 12, whereas the lenses are stored by turning the first lens barrel 11. Therefore, it is necessary to provide a suitable driver means for turning the second and first lens barrels 12, 11. One example of such a driver means for turning the second lens barrel 12 will be described below.

Figure 9:
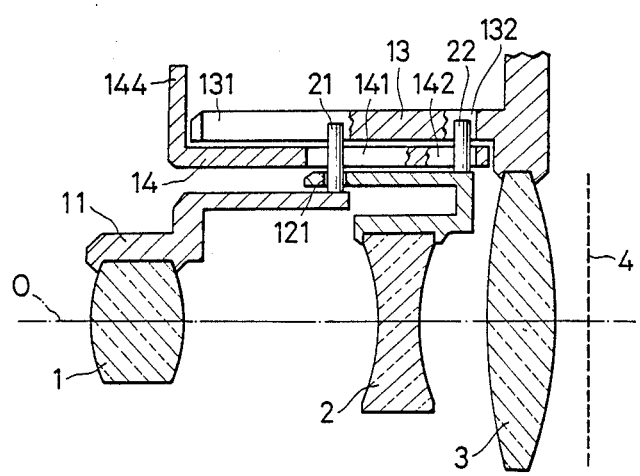
FIG. 9 is a cross-sectional view of the zoom lens with a driver means added.
Figure 10:
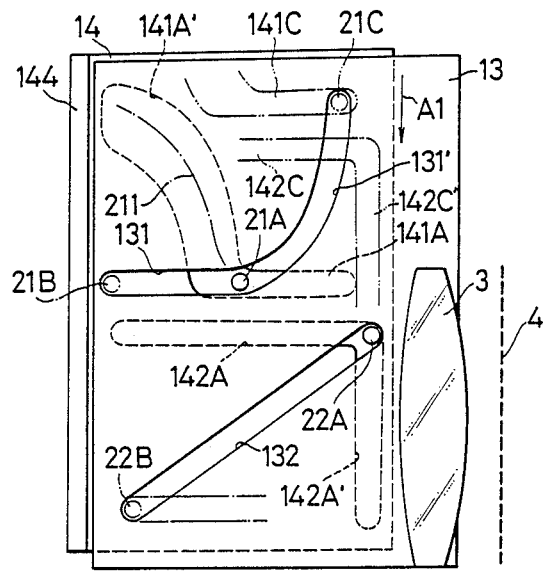
FIG. 10 is a developed plan view of the cam grooves of the zoom lens.

FIGS. 9 and 10 show a driver barrel 14 which serves as a fourth lens barrel for turning the second lens barrel 12. The driver barrel 14 is positioned within the third lens barrel 13, although the driver leans barrel 14 may be disposed either outside of or within the third lens barrel 13. FIG. 9 fragmentarily illustrates the lens barrels which are in the initial position, i.e., at the stroke end of the wide angle setting. FIG. 10 shows the cam grooves in a developed fashion, with only cam grooves of the driver barrel 14 and the pins being illustrated with respect to the fixed third lens barrel 13 for the sake of brevity.

As shown in FIGS. 9 and 10, the driver barrel 14 has a straight cam groove 141 extending parallel to the optical axis O, with the pin 21 engaging in the cam groove 141. The cam groove 141 is contiguous to a wider curved cam groove 141' at its end remote from the image formation plane 4. The driver barrel 14 also has a cam groove 142 in which the pin 22 of the second lens barrel 12 engages. The cam groove 142 extends rectilineraly parallel to the cam groove 141 and has a length which is at least equal to the distance that the pin 22 can move along the optical axis O. The cam groove 142 is contiguous to a cam groove 142' at its end closer to the image formation plane 4, the cam groove 142' extending in a direction normal to the cam groove 142. In the developed view of FIG. 10, the cam groove 142' is shown as straight perpendicularly to the cam groove 142. Actually, however, the cam groove 142' is defined in a circumferential wall of the driver barrel 14 around the optical axis O and has a length which is at least equal to the distance that the pin 21 can move circumferentially. The cam grooves 141', 142' may be wider than the other cam grooves since the cam grooves 141', 142' simply serve to accommodate the pins, as described later on. The driver barrel 14 includes a control member 144 which projects radially outwardly from an end thereof and is exposed outside of the camera body.

The various components as indicated with suffixes A, B, C in FIG. 10 are located in the wide angle setting, telephoto setting, and stored positions, respectively.

The driver barrel 14 shown in FIGS. 9 and 10 will operate as follows:

The control member 144 of the driver barrel 14 is turned from the initial position around the optical axis O in the direction of the arrow A1. The pin 22 engaging in the cam groove 142 is now pushed by the cam groove 142, causing the second lens barrel 12 to turn around the optical axis O. The first and second lens barrels 11, 12 are now moved in the same manner as described with reference to FIG. 7 except that the second lens barrel 12 is forced by the driver barrel 14 through the pin 22. During this time, the pin 22 is forced by the axially straight cam groove 142 only in the direction of the arrow A1, and is free to move along the optical axis O. Simultaneously, the pin 21 is guided by the cam groove 131 to move only along the optical axis O, and such movement of the pin 21 is not prevented by the cam groove 141' as it is wide and does not interfere with the pin 21. The pin 21 moves relatively to the cam groove 141' along a path 211. The focal length can thus be continuously changed from the wide angle setting to the telephoto setting and vice versa in the same manner as described with reference to FIG. 7.

For storing the lens barrels, the control member 144 is turned in a direction opposite to the direction A1 after the control member 144 has returned from the telephoto setting position to the initial position. The pin 22 is now received in the cam groove 142' which does not interfere with the pin 22, with the result that the pin 22 and hence the second lens barrel 12 remain at rest in the initial position. Inasmuch as the cam groove 141 which the pin 21 engages lies parallel to the optical axis O, the cam groove 141 pushes the pin 21 circumferentially to cause the same to move in and along the curved cam groove 131' until the pin 21 reaches the terminal end of the cam groove 131', thus driving the first lens barrel 11. Therefore, only the first lens 1 is moved toward the image formation plane 4 into the stored position, while the second lens 2 remains in the wide angle setting position.

With the arrangement of FIGS. 9 and 10, the desired zooming and lens storing operation can be effected simply by turning the driver barrel 14.

In the structure of FIG. 7, the first lens barrel 1 is freely movable from the initial position toward the stored position. Therefore, when a picture is to be taken at the wide angle setting, i.e., with the lenses in the initial position, the first lens barrel 1 may be displaced out of the initial position toward the stored position, and the user may release the shutter without realizing the displacement of the first lens barrel 1. To prevent this drawback, it is preferable to provide a suitable limit mechanism such as a click mechanism or a lock mechanism for temporarily stopping the first lens barrel 1 from moving from the initial position to the stored position. Such a limit mechanism may be disposed between the pin 21 and the cam groove 121 or the cam groove 131'. However, with the construction of FIG. 9, it is also effective to position the limit mechanism between the driver barrel 14 and the fixed lens barrel 13.

Figure 11:
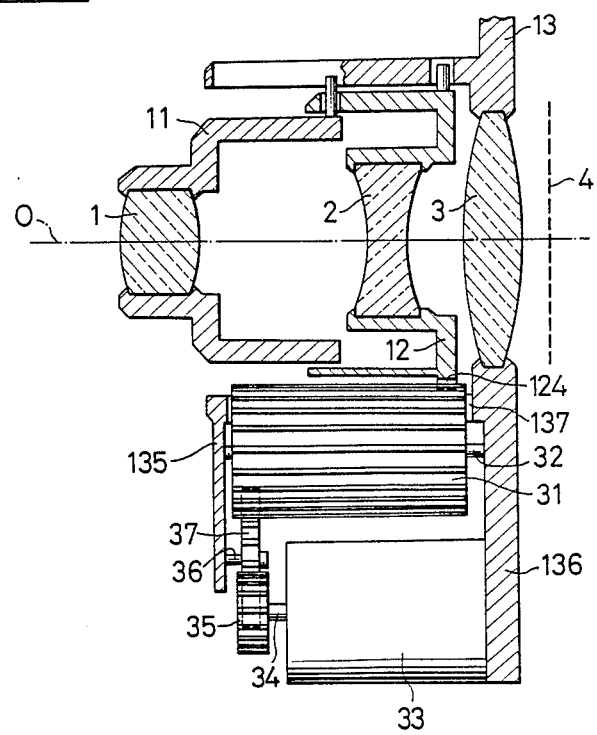
FIG. 11 is a cross-secional view of a zoom lens according to another embodiment of the present invention.

FIG. 11 shows another embodiment in which the second lens barrel is driven by a motor.

In FIG. 11, the second lens barrel 12 has a sector gear 124 on an outer circumferential surface thereof which is substantially diametrically opposite to the pin 22, the sector gear 124 meshing with a gear 31. The fixed lens barrel 13 is integrally formed with a wall 136 and a subplate 135 parallel thereto, which are substantially diametrically opposite to the area in which the cam grooves are defined. The gear 31 is rotatably supported by a shaft 32 supported between the wall 136 and the subplate 135. The fixed lens barrel 13 has a hole 137 which is defined between the wall 136 and the subplate 135 and in which the sector gear 124 and the gear 31 mesh with each other. An idle gear 37 is rotatably supported by a shaft 36 on the subplate 135. A motor 33 is fixed to the wall and has an output shaft 34 supporting a pinion 35 force-fitted over the end thereof and held in mesh with the idle gear 37. The idle gear 37 thus serves to transmit rotative power from the pinion 35 to the gear 31. The motor 33 is rotatable selectively in opposite directions by a power supply and a control circuit (both not shown).

When the motor 33 is energized by the control circuit to rotate in one direction through a certain angular interval, the rotative power from the motor 33 is transmitted to the gear 31 and then to the sector gear 124 to rotate the second lens barrel 12. Since the second lens barrel 12 is angularly moved around the optical axis O and also axially moved along the optical axis O, the sector gear 124 is also moved along the optical axis O. The gear 31 is axially elongate to prevent the sector gear 124 as it axially moved from being thrown out of meshing engagement with the gear 31 while allowing axial movement of the second lens barrel 12. The angular interval which the second lens barrel 12 is turned is selected so as not to cause the pin 22 to engage the gear 31 upon angular movement of the second lens barrel 12.

In the embodiment of FIG. 11, zooming is effected by the motor power. However, since no rotative power of the motor 33 is transmitted to the first lens barrel 11, the first lens barrel 11 cannot be brought into the stored position by the motor 33. Therefore, it is necessary to add a suitable means for storing the first lens barrel 11. Such a means may comprise a separate transmission mechanism for transmitting the rotative power of the motor 33 to the first lens barrel 11, or more simply, the first lens barrel 11 may be turned manually. As is apparent from the arrangement of FIG. 7, the first lens barrel 11 is angularly movable independently of the second lens barrel 12 when in the initial position, and the other components will not be affected by turning the first lens barrel 11 to move from the initial position to the stored position.

In the aforesaid embodiments, the second lens barrel is directly or indirectly driven for zooming. Alternatively, the lens barrels may be arranged so that the first lens barrel can be driven to move the second lens barrel. With such an alternative zoom lens, the first lens can be stored in the same fashion as described above though the cam grooves may be of different shapes.

The cam grooves are employed in the aforesaid embodiments for zooming and storing the first lens barrel. It is also possible to effect zooming and store the first lens barrel by using motors. More specifically, the first and second lens barrels may be actuated by independent stepping motors which are individually controlled by a computer.

The zoom lens types shown in FIGS. 1(*a*) through 1(*c*), to which the present invention applicable, are composed of convex and concave lenses. However, the present invention is equally applicable to zoom lenses of other types.

FIGS. 12(*a*) and 12(*b*) show zoom lenses including two convex lenses as disclosed in Japanese Laid-Open Patent Publications Nos. 58-137813 and 58-184917. The zoom lenses shown in FIGS. 12(*a*) and 12(*b*) are basically of the same type in that they include first and second lenses 1, 2 of convex shape, but differ from each other in that the zoom lens of FIG. 12(*b*) additionally includes a third concave lens 3 of weak power which is fixed near the image formation plane 4. The lenses shown on the upper line are in the wide angle setting and the lenses shown on the lower line are in the telephoto setting. The first and second lenses 1, 2 are more spaced in the telephoto setting than in the wide angle setting. Therefore, the stroke end of the telephoto setting is selected as the initial position.

FIG. 13 shows a cam groove arrangement for operating the zoom lens type as shown in each of FIGS. 12(*a*) and 12(*b*). A driver means employed in the zoom lens comprises a driver barrel similar to that shown in FIG. 9. A fixed lens barrel 13 has cam grooves 131, 132 which provide paths of travel of the first and second lenses 1, 2, respectively. A driver barrel 14 has a straight cam groove 145 extending in the direction of the optical axis. The pins 21, 22 of the first and second lens barrels 12, 13 engage in the cam groove 145 where it crosses the cam grooves 131, 132. Upon angular movement of the driver barrel 14 in the direction of the arrow B1, the first and second lens barrels 11, 12 are moved in and along the cam grooves 131, 132 for zooming. The cam grooves 131, 132 are contiguous to cam grooves 131', 132', respectively, at their ends closer to the initial position for moving the first lens barrel toward the second lens barrel into the stored position in response to angular movement of the driver barrel 14 in the direction of the arrow B2. The components as indicated with suffixes A, B, C in FIG. 10 are located in the telephoto setting which is the initial position, the wide angle setting, and the stored position.

The principles of the present invention as described above can be applied to a known zoom lens comprising convex, concave, and convex lenses.

The present invention is also applicable not only to a zoom lens for use on a rangefinder-equipped camera with a short back focus, but also to a zoom lens for use on a single-lens reflex camera. On the single-lens reflex camera, the first lens can also be moved toward the image formation plane when not in use to bring the zoom lens into the stored condition with a reduced overall length. The zoom lens of the present invention can therefore be of a compact size with good portability.

FIGS. 14 and 15 show a lens protector according to an embodiment of the present invention. A photographic lens 201 having a short back focus is disposed in the dark chamber of a camera body or housing 202 and has a curved rear surface 201a positioned closely to a film gate 203. A lens protecting member or cover 204 is disposed between the film gate 203 and the rear lens surface 201a. The lens protecting member 204 is movable between a closing position in which it closes an aperture 205 that determines an image plane to be exposed, i.e., it closes a photographing light path, and an open position in which the lens protecting member 204 is retracted from the photographing light path. The lens protecting member 204 comprises a panel of relatively high rigidity which has an arcuate shape substantially along the curved rear surface 201a of the lens 201. The lens protecting member 204 is slidably disposed between two spaced guide rails 206 each having an arcuate shape substantially along the rear lens surface 201a. The lens protecting member 204 has a rack 204a on its rear surface remote from the lens 201 and is coupled at one end (lefthand side end in FIGS. 14 and 15) thereof to a tension spring 207 which normally urges the lens protecting member 204 toward the closing position. A transmission gear 208 is rotatably supported in the camera housing 202 in the vicinity of the other end of the lens protecting member 204, the transmission gear 208 being rotatable in synchronism with film winding operation. A pinion 209 is disposed in meshed relationship with the rack 204a and the transmission gear 208 for transmitting rotative power from the transmission gear 208 to the rack 204a. The rack 204a and the pinion 209 may be replaced with a worm gear and a worm. The transmission gear 208 can be driven by a film winding mechanism (not shown).

When a film 210 is initially wound by the film winding mechanism, the transmission gear 208 is also rotated to cause the pinion 209 and the rack 204a to move the lens protecting member 204 along the guide rails 206 from the closing position to the open position against the resiliency of the tension spring 207. The lens protecting member 204 is retracted from the aperture 205 over an interval corresponding to one or two frames of the film 210, i.e., until a first film frame is set. Thereafter, the pinion 209 is idly rotated at the terminal end of the rack 204a to keep the film protecting member 204 in the open position.

After the film 210 has been exposed, the film 210 is rewound into its cartridge. In synchronism with such rewinding operation, a clutch (not shown) associated with the transmission gear 208 is released from the film winding mechanism, or the pinion 209 is brought out of meshed relationship with the rack 204a. The lens protecting member 204 is now caused by the resilient forces of the tension spring 207 to return to the closing position in which the lens protecting member 204 is located in the photographing light path.

When replacing the film 210 with a new film by opening the back cover (not shown) of the camera, fingers, dust and dirt are prevented from touching or being applied to the rear surface 201a of the lens 201 because the rear lens surface 201a is covered with the lens protecting member 204. As a result, no fingerprints or other deposits are applied to the rear lens surface 201a, and the rear lens surface 201a is protected against scratches or other damage which would otherwise result from wiping the rear lens surface 201a.

Since the lens 201 is automatically opened and closed by the lens protecting member 204 in timed relation to winding and rewinding of the film 210, the user of the camera is not required to pay special attention to the protection of the lens 201. Conventional cameras cannot easily be handled when loading a film since the user must be careful not to apply fingerprints or other dirt or dust to the lens 201. With the arrangement of the present invention, however, the lens protecting member 204 makes it easily for the user to load a film without exercising care in avoiding application of fingerprints or dirt or dust deposits. The camera with the lens protector can thus be handled with ease.

Generally, wires, cams, and other members are exposed in a lens barrel. When the aperture 205 is viewed by opening the back cover of the camera housing 202, the exposed wires, cams, and other members would also be seen as magnified by the lens 201. However, the lens protecting member 204 which closes the aperture 205 conceals those wires, cams, and other members from view.

FIGS. 16 through 18 illustrate a lens protector according to another embodiment of the present invention. The photographic lens 201 is positioned in the dark chamber of the camera housing 202 with its rear surface 201a near a film gate 211 in the camera housing 202. A lens protecting member or cover 212 is movable between a closing position in which it lies on the film gate 211 and an open position in which the lens protecting member 212 is retracted away from the film gate 211. The lens protecting member 212 is in the form of a horizontally elongate web or screen having such a size that it can well cover the aperture 205 when it is in the closing position. The lens protecting member 212 has one end (righthand side end in FIGS. 16 and 17) connected to a film take-up spool 213. The opposite end (lefthand side end) is joined to two spaced strings 215 that are resiliently urged by a spiral spring 214 to return in a direction opposite to the direction in which the film 210 is wound up. The spiral spring 214 is normally biased under its own resiliency to be wound on itself for urging a bobbin 216 (FIG. 18) to turn counterclockwise to wind the two strings 215 thereon. The bobbin 266 is attached coaxially to a gear 217 in meshing relationship with a gear 220 integral with a cartridge driver shaft 219 for rotating a film cartridge 218. The film take-up spool 213 has two rows of teeth 221 disposed on upper and lower ends thereof at equally angular spacings for engaging in perforations defined in the film 210 to wind the film 210 on the film take-up spool 213.

Operation of the film protector shown in FIGS. 16 through 18 is as follows:

The film cartridge 218 is loaded in a cartridge chamber of the camera housing 202, and then the tip end of the film 210 is pulled out. With some perforations of the film 210 being fitted over certain teeth 221 on the film take-up spool 213, the back cover is closed and the film take-shaft 213 is turned counterclockwise (FIG. 16) manually or by a motor. When one or two frames of the film 210 are wound on the film take-up spool 210, the winding operation is stopped in readiness for exposing the film 210. At the time the film 210 is thus wound by the film take-up spool 213, the lens protecting member 212 with its end coupled to the film take-up shaft 213 is also wound on the film take-up spool 213. When the first frame to be exposed of the film 210 is positioned in the aperture 205, the lens protecting member 212 has already been retracted from the photographing light path in the aperture 205. Therefore, light from an object to be photographed is not blocked by the lens protecting member 212, but is allowed to pass through the aperture 205.

As the lens protecting member 212 is displaced to its open position, the strings 215 are reeled off the bobbin 216. Upon transport of the film 210 in its winding direction, the bobbin 216 is rotated clockwise by the cartridge driver shaft 219 through the gears 220, 217. The spiral spring 214 now stores energy therein.

During the photographing operation, the film 210 is successively exposed frame by frame. After the final frame has been exposed, the cartridge driver shaft 219 is turned in a rewinding direction manually or by the motor to rewind the exposed film 210 back into the cartridge 218. In this film rewinding operation, the strings 215 are wound on the bobbin 216 which is rotated counterclockwise under the resiliency of the spiral spring 214. As the strings 215 are about to be completely wound on the bobbin 216, the lens protecting member 212 is moved from the open position to the closing position.

Since the lens protecting member 212 is in the form of a flexible web or screen that can be wound on the film take-up spool 213, the space that is taken up by the lens protecting member 212 is smaller than that required by the lens protecting member 204 shown in FIGS. 14 and 15.

FIGS. 19 through 23 show a lens protector according to still another embodiment of the present invention. The lens protector includes a lens protecting member or cover 224 movable on a film gate 223 disposed closely to the rear surface 201a of the photographic lens 201. The lens protecting member 224 is movable between a closed position (FIGS. 19 and 20) in the aperture 205 and an open position in which the lens protecting member 224 is retracted out of the aperture 205. The lens protecting member 224 is in the form of a horizontally elongate web or screen having such a size that it can cover at least the aperture 205 when it is in the closed position. The lens protecting member 224 has one end (righthand side end in FIGS. 19 and 20) connected to a film take-up spool 225. To the other end of the lens protecting member 224, there are connected upper and lower pins 226 which are retained by upper and lower resilient hooks 227 disposed near one end of the aperture 205 remotely from the film take-up spool 225, when the lens protecting member 224 is in the closing position. The camera housing 202 has upper and lower slide grooves 208 defined horizontally above and below the aperture 205 for guiding the pins 226 to move therealong. The camera housing 202 also has upper and lower slits 229 defined near the film take-up spool 225 for allowing the pins 226 to drop therethrough into the camera housing 202.

As shown in FIG. 22, a take-up member 230 for winding the lens protecting member 224 comprises two semicylindrical members having slide pieces directed toward the central axis. The slide pieces are symmetrically or diametrically oppositely fitted in the film take-up spool 225. Tension springs 231 are interposed between the film take-up spool 225 and the two semicylindrical members of the take-up member 230 for normally urging the semicylindrical members radially outwardly. When the lens protecting member 224 is wound on the take-up member 230, as shown in FIG. 22, the semicylindrical members are displaced radially inwardly, i.e., the outside diameter of the take-up member 230 is reduced against the resiliency of the tension springs 231. When the film 210 and the lens protecting member 224 are unwound from the take-up member 230, as shown in FIG. 23, the outside diameter thereof is increased under the resiliency of the tension springs 231.

The lens protector shown in FIGS. 19 through 23 will operate as follows: After the film 210 is loaded, the back cover is closed and the film take-up spool 225 is rotated manually or by a motor. The film 210 and the lens protecting member 224 are wound on the take-up member 230 around the film take-up spool 225. After a coule of film frames have been wound on the take-up member 230, the take-up member 230 is radially compressed from the position of FIG. 23 to the position of FIG. 22 against the resiliency of the springs 231. As the film 210 and the lens protecting member 224 are thus wound on the take-up member 230, the pins 226 are forced out of the hooks 227 and moved along the slide grooves 228. At the time one or two film frames have been wound, the pins 226 drop through the slits 229 into the camera housing 2 and are held against the take-up member 230 as shown in FIGS. 21 and 22. Therefore, the lens protecting member 224 is retracted out of the aperture 205, i.e., the photographing light path.

When the cartridge driver shaft 219 is rotated back to rewind the film 210, the film 210 is wound on the spool in the cartridge 218. Immediately before the tip end of the film 210 disengages from the take-up member 230, the take-up member 230 is expanded radially outwardly under the bias of the tension spring 231. The pins 226 are also displaced radially outwardly and pulled out of the slits 229 into the slide grooves 228 under frictional forces between the lens protecting member 224 and the film 210. As the film 210 is continuously rewound, the pins 226 are finally moved into the hooks 227 and retained thereby as shown in FIGS. 19 and 20. The lens protecting member 224 is now in the closed position in which it covers the aperture 205.

According to still another embodiment shown in FIG. 24, two take-up members 232 each in the form of a comma-shaped bead are angularly movably supported on an attachment disc 233 by shafts 234, respectively, in diametrically opposite relation across the film take-up spool 225. The take-up members 232 are normally urged to move their tip ends radially outwardly by torsion springs 235 acting between the take-up members 232 and the film take-up spool 225.

FIG. 25 illustrates another embodiment in which a film take-up spool 36 has a diametrical slot and a substantially S-shaped leaf spring 237 is inserted as a take-up member in the slot of the film take-up spool 36. The leaf spring 237 has its tip ends resiliently biased radially outwardly.

FIGS. 26 through 28 show various modifications of the arrangement of FIGS. 19 and 20. In FIG. 26, the pin 226 is retained in a hook 238 by a leaf spring 239 disposed in the hook 238 and having a mountain-shaped cross section. In FIG. 27, a hook 240 is integrally formed with the camera housing 202 which is molded of plastics. In FIG. 28, a pin 241 is made of a magnetic material such as metal, and is retained by a magnet 242 on the camera housing.

The lens protecting member may be moved between the closing and open positions by a sector gear which is angularly movable in response to the opening and closing of the back cover and which is operatively coupled to the pinion 209 (FIG. 1) to transmit rotary motion thereto.

I claim:

1. A zoom lens comprising at least a first lens and a second lens which are a greater distance from each other in one of telephoto setting and wide angle setting than the other setting, said zoom lens moving along an optical path between said telephoto setting and said wide angle setting, and a mechanism for moving said first lens from said one setting toward an image formation plane when said zoom lens is not in use so as to be compactly housed.

2. A zoom lens according to claim 1, wherein said first and second lenses are more spaced from each other in said wide angle setting.

3. A zoom lens according to claim 1, wherein said first and second lenses are spaced a greater distance from each other in said telephoto setting.

4. A zoom lens according to claim 1, wherein said first lens is moved toward said image formation plane as closely to said second lens as possible.

5. A zoom lens according to claim 1, wherein said first lens has positive power and said second lens has negative power.

6. A zoom lens according to claim 1, wherein each of said first and second lenses has positive power.

7. A zoom lens according to claim 1, further including a first movable lens barrel supporting said first lens and having a pin, a second movable lens barrel supporting said second lens and having a cam groove, and a third fixed lens barrel having a straight groove extending along an optical axis of the zoom lens, said pin engaging in said cam groove and said straight groove, so that zooming is effected by turning said second lens barrel.

8. A zoom lens according to claim 7, wherein said third lens barrel has a cam groove contiguous to said straight groove and acting to move said first lens.

9. A zoom lens according to claim 8, wherein said cam groove of said third lens barrel is of the same shape and size as those of said cam groove of said second lens barrel and can overlap said cam groove of said second lens barrel.

10. A zoom lens according to claim 7, further including a motor for driving said second lens barrel.

11. A zoom lens comprising a first lens, a second lens, and a third lens, said first and second lenses being spaced a greater distance from each other in one of telephoto setting and a wide angle setting than the other setting, said zoom lens moving along an optical path between said telephoto setting and said wide angle setting, and a mechanism for moving said first lens from said one setting toward an image formation plane when said zoom lens is not in use so as to be compactly housed.

12. A zoom lens according to claim 11, wherein said first and second lenses are greater distance spaced from each other in said wide angle setting.

13. A zoom lens according to claim 11, wherein said first and second lenses are a greater distance spaced from each other in said telephoto setting.

14. A zoom lens according to claim 11, wherein said first lens is moved toward said image formation plane as closely to said second lens as possible.

15. A zoom lens according to claim 11, wherein said first lens has positive power, said second lens has negative power, and said third lens has positive power.

16. A zoom lens according to claim 11, wherein said first lens has positive power, said second lens has negative power, and said third lens has negative power.

* * * * *

(12) REEXAMINATION CERTIFICATE (4830th)
United States Patent
Ozawa et al.

(10) Number: US 4,779,964 C1
(45) Certificate Issued: Aug. 19, 2003

(54) ZOOM LENS WITH A MECHANISM FOR MOVING A FIRST LENS SO AS TO BE COMPACTLY HOUSED

(75) Inventors: Toshiro Ozawa, Kawasaki (JP); Yoshio Fukushima, Machida (JP); Kenichi Takanashi, Yokohama (JP)

(73) Assignee: Ricoh Company, Ltd., Tokyo (JP)

Reexamination Request:
No. 90/006,052, Jul. 6, 2001

Reexamination Certificate for:
Patent No.: 4,779,964
Issued: Oct. 25, 1988
Appl. No.: 06/928,856
Filed: Nov. 10, 1986

(30) Foreign Application Priority Data

Nov. 8, 1985 (JP) .......................................... 60-250352
Feb. 6, 1986 (JP) ............................................ 61-15061

(51) Int. Cl.$^7$ ................................................ G02B 15/14
(52) U.S. Cl. ...................................... 359/690; 359/700
(58) Field of Search ................................ 359/685, 689, 359/690, 692, 700, 696, 701, 703, 704; 396/349, 72

(56) References Cited

FOREIGN PATENT DOCUMENTS

| JP | S58-40733 | 9/1981 |
| JP | 60-162216 | 8/1985 |

*Primary Examiner*—Ricky Mack

(57) ABSTRACT

A zoom lens has at least a first group lens and a second group lens which are spaced a greater distance from each other in one of telephoto setting and wide angle setting than the other setting, and a mechanism for moving the first group lens from said one setting toward an image formation plane

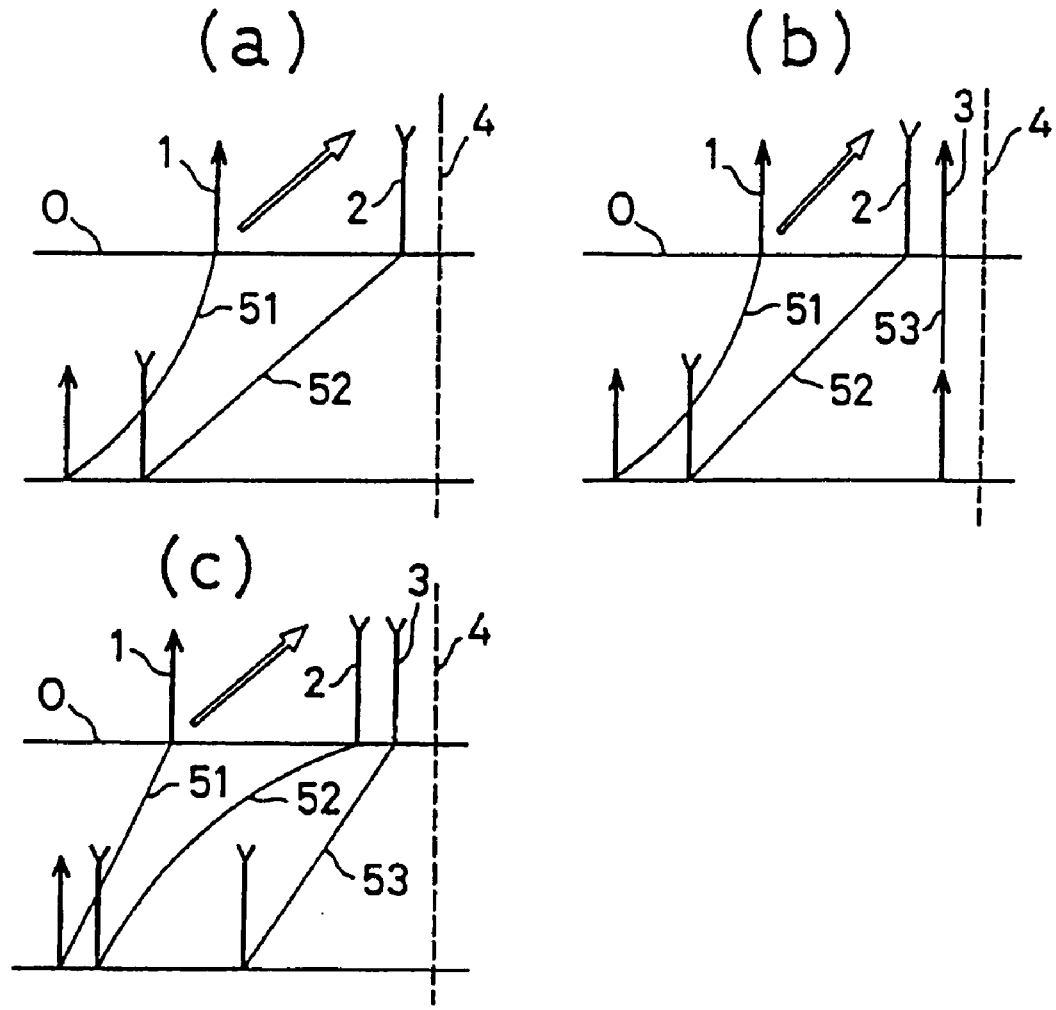

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11–16 is confirmed.

Claims 1, 3, 4, 6 and 7 are determined to be patentable as amended.

Claims 2, 5 and 8–10, dependent on an amended claim, are determined to be patentable.

1. A zoom lens *mounted on a camera body* comprising at least a first lens and a second lens which are a greater distance from each other in one of telephoto setting and wide angle setting than the other setting, said zoom lens moving along an optical path between said telephoto setting and said wide angle setting, and a mechanism for moving said first lens from said one setting toward an image formation plane when said zoom lens is not in use so as to be [compactly housed] *moved into the camera body for storage*.

3. A zoom lens [according to claim 1] *comprising at least a first lens and a second lens which are a greater distance from each other in one of telephoto setting and wide angle setting than the other setting, said zoom lens moving along an optical path between said telephoto setting and said wide angle setting, and a mechanism for moving said first lens from said one setting toward an image formation plane when said zoom lens is not in use so as to be compactly housed,* wherein said first and second lenses are spaced a greater distance from each other in said telephoto setting.

4. A zoom lens [according to claim 1] *comprising at least a first lens and a second lens which are a greater distance from each other in one of telephoto setting and wide angle setting than the other setting, said zoom lens moving along an optical path between said telephoto setting and said wide angle setting, and a mechanism for moving said first lens from said one setting toward an image formation plane when said zoom lens is not in use so as to be compactly housed,* wherein said first lens is moved toward said image formation plane as closely to said second lens as possible.

6. A zoom lens [according to claim 1] *comprising at least a first lens and a second lens which are a greater distance from each other in one of telephoto setting and wide angle setting than the other setting, said zoom lens moving along an optical path between said telephoto setting and said wide angle setting, and a mechanism for moving said first lens from said one setting toward an image formation plane when said zoom lens is not in use so as to be compactly housed,* wherein each of said first and second lenses has positive power.

7. A zoom lens [according to claim 1] *comprising at least a first lens and a second lens which are a greater distance from each other in one of telephoto setting and wide angle setting than the other setting, said zoom lens moving along an optical path between said telephoto setting and said wide angle setting, and a mechanism for moving said first lens from said one setting toward an image formation plane when said zoom lens is not in use so as to be compactly housed,* further including a first movable lens barrel supporting said first lens and having a pin, a second movable lens barrel supporting said second lens and having a cam groove, and a third fixed lens barrel having a straight groove extending along an optical axis of the zoom lens, said pin engaging in said cam groove and said straight groove, so that zooming is effected by turning said second lens barrel.

\* \* \* \* \*